US012431053B1

(12) United States Patent
Ikizyan et al.

(10) Patent No.: US 12,431,053 B1
(45) Date of Patent: Sep. 30, 2025

(54) OVERDRIVE TECHNIQUE FOR FASTER SWITCHING IN FIELD SEQUENTIAL DISPLAY

(71) Applicant: QUALCOMM Incorporated, San Diego, CA (US)

(72) Inventors: Ike Ikizyan, San Diego, CA (US); Mark Sternberg, Toronto (CA); Natan Jacobson, San Diego, CA (US); Daniel Stan, Thornhill (CA); Timothy David Tang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/618,811

(22) Filed: Mar. 27, 2024

(51) Int. Cl.
*G09G 3/20* (2006.01)

(52) U.S. Cl.
CPC ... *G09G 3/2003* (2013.01); *G09G 2320/0242* (2013.01)

(58) Field of Classification Search
CPC ..................... G09G 3/2003; G09G 2320/0242
See application file for complete search history.

(56) References Cited

U.S. PATENT DOCUMENTS

2006/0181503 A1 8/2006 Feng
2018/0096669 A1 4/2018 Koizumi
2019/0066569 A1* 2/2019 Tang .................... G09G 3/2003
2022/0093030 A1* 3/2022 Kim .......................... G09G 5/10
2023/0140006 A1* 5/2023 Song .................... H04N 19/132
382/300

OTHER PUBLICATIONS

International Search Report and Written Opinion—PCT/US2025/014332—ISA/EPO—Apr. 29, 2025 (2401854WO).

Sekiya K., et al., "9.5L: Late-News Paper: Overdrive Method for TN-mode LCDs—Recursive System with Capacitance Prediction—", 2001 SID International Symposium—Jun. 3, 2001-Jun. 8, 2001, San Jose Convention Center, California, vol. XXXII, Jun. 3, 2001, p. 114, pp. 114-117, XP007007627, The Whole Document.

Sekiya K., et al., "LP-4: Late-News Poster: Overdrive for Compensating Color-Shift on Field Sequential Color TFT-LCDs", 2004 SID International Symposium, Seattle, WA, May 25, 2004-May 27, 2004 [SID International Symposium], San Jose, CA : SID, US, vol. XXXV, May 25, 2004, pp. 408-411, XP007012031, The Whole Document.

* cited by examiner

*Primary Examiner* — Premal R Patel
(74) *Attorney, Agent, or Firm* — NORTON ROSE FULBRIGHT US LLP

(57) ABSTRACT

This disclosure provides systems, methods, and devices for the prevention of color leakage in Field Sequential Display while maintaining display brightness. In a first aspect, a method of signal processing includes receiving a first frame of a first color of image data; selecting a modified first frame of the first color by applying a recursive filter to the first frame, wherein the recursive filter is associated with at least one previous frame of a second color different from the first color; and selecting first pixel drive values associated with the modified first frame. Other aspects and features are also claimed and described.

18 Claims, 8 Drawing Sheets

OVERDRIVE TECHNIQUE FOR FASTER SWITCHING IN FIELD SEQUENTIAL DISPLAY

TECHNICAL FIELD

Aspects of the present disclosure relate generally to electronic displays, and more particularly, to driving pixels of an electronic display to improve switching rate by, in certain implementations, using a recursive filter. Some features may enable and provide improved display output quality.

INTRODUCTION

As the value and use of information continues to increase, individuals and businesses seek additional ways to process, display and store information. In addition, the use of information in various locations and desired portability of information is increasing. For this reason, users are increasingly turning towards the use of electronic devices with electronic displays, such as mobile phones, digital tablets, laptop computers and the like. The perceived quality of the display, and thus the user's experience with the display and device, is impacted by operational characteristics of the electronic display, including the switching rate of pixels in the electronic display. As different data, whether documents, photographs, or movies, is displayed on the electronic display, portions of the display change color, such as from light red to dark red or from green to blue. It is desirable that the electronic display switch colors faster than the human eye can perceive so that the user does not see artifacts due to the transition between colors.

One electronic display that is prone to such transition artifacts is the field sequential display. The field sequential display operates by separately showing individual colors in an image at a fast rate that the human eye perceives the merged result of the individual colors. For example, first a red light is shown from the display, followed by green light and then blue light, but the switching between colors is fast enough that the human eye can perceive a purple color, or other mix of the red, green, and blue. The operation of a field sequential display involves displaying those three colors at combined rate that is the desired rate of display. For example, if a display of 30 frames per second (fps) (also referred to as fields per second) is desired then the field sequential display must operate at 90 frames per second (fps) to allow display of red, green, and blue colors within the time of a single perceived frame. This results in the sequential field display needing to operate at higher transition speeds to achieve a desired perceived frame rate. This challenge to transition speeds is further exaggerated when the desired perceived frame rate is increased to 60 fps or 120 fps, at which the sequential field display operates at 180 fps or 360 fps. When the electronic display does not respond as fast as the desired perceived frame rate, image artifacts occur, such as color leaking. These artifacts reduce the user's experience with the electronic display and device because the reproduced images are not accurate.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The transition speed of electronic displays, such as field sequential displays, can be improved by increasing the magnitude of change in a control signal applied to pixels of the display. The result is a drive signal for controlling the colors output from the display that is exaggerated. For example, consider an operating conditions when a pixel is switching from bright green to green. For this transition, according to aspects of this disclosure, the pixel is driven not based on the difference between the bright green and the green but based on the difference between the bright green and a dark green. The exaggerated difference results in amplifying the control signal for driving the pixel, which increases the transition speed of the pixel. In a field sequential display, this overdrive technique may be applied by amplifying a control signal for a pixel transitioning from one state for displaying a first color to a second state for displaying a second color. That is, the drive signal may be amplified when switching a pixel from bright green to red by controlling the drive signal to switch from the bright green to a dark red. This overdrive technique determines a drive signal for pixels of the electronic display based on one or more previous colors of the pixels using, for example, a recursive filter. The result is a faster transition speed that reduces color mixing in electronic displays, such as field sequential color displays.

In some aspects, a method of operation may include receiving, from a first processing system, a first frame of a first color of the image data. The processing system may then determine a modified first frame of the first color by applying a recursive filter to the first frame. The recursive filter may be associated with at least one previous frame of a second color different from the first color. In some implementations, the output of the recursive filter is blended with the original image frame to determine the modified image frame. The modified image frame is used to determine drive values for the electronic display.

In some aspects, an apparatus may include a memory storing processor-readable code with one or more processors coupled to the memory. The one or more processors configured to execute the processor-readable code may cause the one or more processors to receive a first frame of a first color of the image data. The one or more processors may then determine a modified first frame of the first color by applying a recursive filter to the first frame. The recursive filter may be associated with at least one previous frame of a second color that is different in color from the first frame. The one or more processors may then determine first pixel drive values associated with the modified first frame and the first frame.

In some aspects, The processor may perform operations which comprise receiving a first frame of a first color of the image data. The processor also may determine a modified first frame of the first color by applying a recursive filter to the first frame. The recursive filter is associated with at least one previous frame of a second color that is different from the first color. The processor may determine first pixel drive values associated with the modified first frame and the first frame.

In some additional aspects, the method applies the recursive filter which comprises retrieving a value from a two-dimensional look-up table to increase the speed of the filter. The recursive filter may accomplish this by indexing into the two-dimensional look-up table using a first pixel value of the first frame and a second pixel value of the second frame. In some additional aspects, the two-dimensional look up table comprises a plane, bi-planar, and Delaunay triangulation. In some additional aspects, the recursive filter may be reconfigured associated with operating conditions of a display. In some additional aspects, the recursive filter may be reconfigured associated with a temperature of the display.

In some additional aspects, the apparatus is configured to perform further operations which comprise determining an amount of motion in the first frame meeting at least one criteria. In some additional aspects, in response to the amount of motion meeting the at least one criteria, the recursive filter may be disabled to conserve processing power in an unobtrusive way. In such a case, the second pixel drive value associated with the first frame is determined.

In some additional aspects, the processing system is further configured to drive a display using the first pixel drive values, wherein the display comprises a field sequential color display. In some additional aspects, determining the first pixel drive values comprises increasing a rate of change of the first pixel drive values associated with the modified first frame above a rate of change of the first pixel drive values associated with the first frame so as to improve the color transition from the first frame to the modified frame.

In one aspect of the disclosure, a method includes receiving, from a processing system, a first frame of a first color of image data; determining, by the processing system, a modified first frame of the first color by applying a recursive filter to the first frame, wherein the recursive filter is associated with at least one previous frame of a second color different from the first color; and determining, by the processing system, first pixel drive values associated with the modified first frame.

In an additional aspect of the disclosure, an apparatus includes at least one processor and a memory coupled to the at least one processor. The at least one processor is configured to perform operations including receiving, by at least one processor from a memory, a first frame of a first color of image data; determining, by the at least one processor, a modified first frame of the first color by applying a recursive filter to the first frame, wherein the recursive filter is associated with at least one previous frame of a second color different from the first color; and determining, by the at least one processor, first pixel drive values associated with the modified first frame.

In an additional aspect of the disclosure, an apparatus includes means for receiving, by at least one processor from a memory, a first frame of a first color of image data; means for determining, by the at least one processor, a modified first frame of the first color by applying a recursive filter to the first frame, wherein the recursive filter is associated with at least one previous frame of a second color different from the first color; and means for determining, by the at least one processor, first pixel drive values associated with the modified first frame.

In an additional aspect of the disclosure, a non-transitory computer-readable medium stores instructions that, when executed by at least one processor, cause the processor to perform operations. The operations include receiving, by at least one processor from a memory, a first frame of a first color of image data; determining, by the at least one processor, a modified first frame of the first color by applying a recursive filter to the first frame, wherein the recursive filter is associated with at least one previous frame of a second color different from the first color; and determining, by the at least one processor, first pixel drive values associated with the modified first frame.

In a further aspect of the disclosure, a multimedia device includes a sequential field display; a memory configured to store image data; and at least one display driver coupled to the memory and to the sequential field display, the at least one display driver configured to perform operations comprising receive a first frame of a first color of the image data; determine a modified first frame of the first color by applying a recursive filter to the first frame, wherein the recursive filter is associated with at least one previous frame of a second color different from the first color; determine first pixel drive values associated with the modified first frame; and drive the sequential field display using the first pixel drive values.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features also may be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some implementations, the processor may be part of a mobile device including a first network adaptor configured to transmit data, such as images or videos (with associated or embedded sounds) in a recording or as streaming data, over a first network connection of a plurality of network connections; and a processor coupled to the first network adaptor and the memory. The processor may cause the transmission of output image frames described herein over a wireless communications network such as a 5G NR communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (such as end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features also may necessarily include additional components and features for implementation and practice of claimed and described aspects. It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
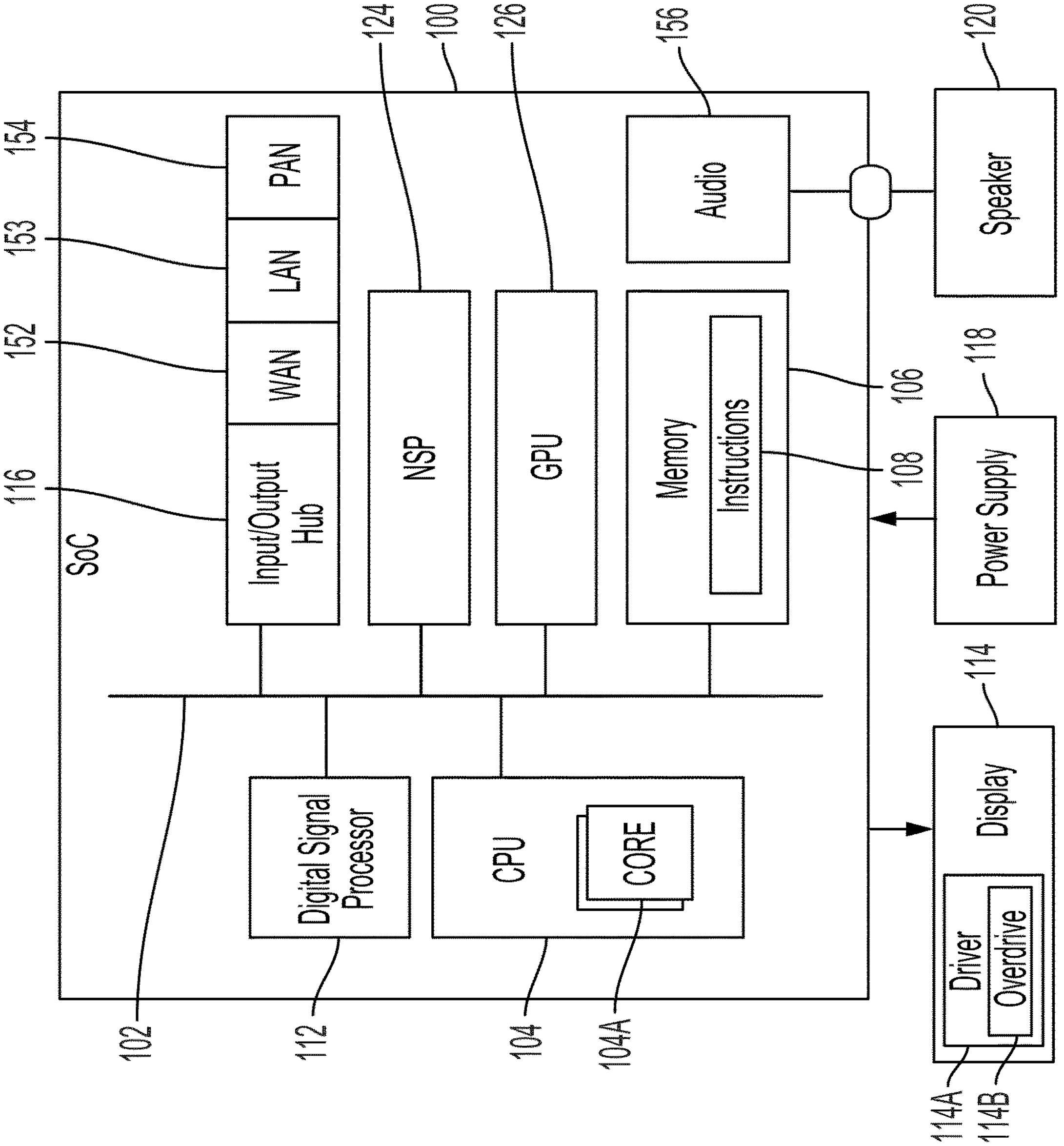
FIG. 1 shows a block diagram of an example system-on-chip (SoC) configured for controlling a display.

The present disclosure provides systems, apparatus, methods, and computer-readable media that support signal processing, including techniques for preventing color leaking in field sequential color displays. In some examples, a processor may receive a first frame of a first color of the image data. The processor may determine, obtain, ascertain, calculate, or select a modified first frame of the first color. The modification of the image frame may be implemented by applying a recursive filter to the first frame to determine, obtain, ascertain, calculate, or select modified values that incorporate overdrive aspects described, for example, in some implementations herein. The recursive filter may be based on at least one previous frame of a second color different from the first color.

In some additional aspects, the apparatus applies the recursive filter which comprises retrieving a value from a two-dimensional look-up table. The recursive filter accomplishes this by indexing into the two-dimensional look-up table using a first pixel value of the first frame and a second pixel value of the second frame. In some additional aspects, the two-dimensional look up table comprises a plane, bi-planar, and Delaunay triangulation. In some additional aspects, the recursive filter may be reconfigured based on operating conditions of a display. In some additional aspects, the recursive filter may be reconfigured based on a temperature of the display.

In some additional aspects, the apparatus is configured to perform further operations which may include selecting to disable the recursive filter when an amount of motion in the first frame meets at least one criteria. The selecting may include determining an amount of motion in the first frame meeting at least one criteria. In some additional aspects, in response to the amount of motion meeting the at least one criteria, the recursive filter is disabled, and a second pixel drive value based on the first frame is determined.

In some additional aspects, the processing system is further configured to drive a display using the first pixel drive values, wherein the display comprises a field sequential color display. In some additional aspects, selecting the first pixel drive values comprises increasing a rate of change of the first pixel drive values based on the modified first frame above a rate of change of the first pixel drive values based on the first frame.

Particular implementations of the subject matter described in this disclosure may be implemented to realize one or more of the following potential advantages or benefits. In some aspects, the present disclosure provides techniques for providing better color quality in field sequential color displays. One nonlimiting benefit of the disclosure is that it may reduce color leaking thereby improving the color quality of the field sequential color (FSC) display. That is, the disclosure may ensure that only the intended color is activated and not unintended colors. Another nonlimiting benefit that may improve the color quality of the field sequential color display is that the output of the recursive filter may be highly tunable. That is, the recursive filter may use one or more than one prior color states, or even current and prior temperature levels, in selecting the modified first frame. The recursive filter may be made more efficient, by limiting the processing power and time required to do calculations for the output, and merely employing the pre-calculated look up tables. Also, the use of a planar look up table or more elaborate look up tables such as bi-linear or interpolated Delaunay triangulation may provide increased tunability of the recursive filter. Another nonlimiting benefit is that the disclosure may enable a longer duty cycle for the backlight of the display while enabling faster color switching thereby increasing the brightness of the display while limiting color leakage. Another nonlimiting benefit of the disclosure is that the recursive filter improves the color display of other display types such as interleaved RGB displays.

The detailed description set forth below, in connection with the appended drawings to which the text references, is intended as a description of various implementations and is not intended to limit the scope of the disclosure. Rather, the detailed description includes specific details for the purpose of providing a thorough understanding of the subject matter of this disclosure. It will be apparent to those skilled in the art that these specific details are not required in every case and that, in some instances, well-known structures and components are shown in block diagram form for clarity of presentation.

In the description of implementations herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

FIG. 1 shows a block diagram of an example system-on-chip (SoC) configured for operating a display. The SoC 100 may include several components coupled together through a bus 102, which may be a network-on-a-chip (NoC) or a plurality of NOCs interconnecting various components. For example, although FIG. 1 illustrates several components coupled to the bus 102, the several components may be coupled to different busses with additional busses connecting the different busses to provide a path for communication between the components.

One example component in the SoC 100 is a digital signal processor 112 for signal processing. The DSP 112 may include hardware customized for performing a limited set of operations on specific kinds of data. For example, a DSP may include transistors coupled together to perform operations on streaming data and use memory architectures and/or access techniques to fetch multiple data or instructions concurrently. Such configurations may allow the DSP 112 to operate on real-time data, such as video data, audio data, image data, or modem data, in a power-efficient manner.

The SoC 100 also includes a central processing unit (CPU) 104 and a memory 106 storing instructions 108 (such as a memory storing processor-readable code or a non-transitory computer-readable medium storing instructions) that may be executed by a processor of the SoC 100. The CPU 104 may be a single central processing unit (CPU) or a CPU cluster comprising two or more cores such as core 104A. The CPU 104 may include hardware capable of performing generic operations on many kinds of data, such as hardware capable of executing instructions from the Advanced RISC Machines (ARM®) instruction set, such as ARMv8 and ARMv9. For example, a CPU 104 may include transistors coupled together to perform operations for supporting executing an operating system and user applications (such as a camera application, a multimedia application, a gaming application, a productivity application, a messaging application, a videocall application, an audio recording application, a video recording application). The CPU 104 may execute instructions 108 retrieved from the memory 106. In some implementations, the CPU 104 executing an operating system may coordinate execution of instructions by various components within the SoC 100. For example, the CPU 104 may retrieve instructions 108 from memory 106 and execute the instructions on the DSP 112.

The SoC 100 may further include a neural signal processor (NSP) 124 for executing machine learning (ML) models relating to multimedia applications. The NSP 124 may include hardware configured to perform and accelerate convolution operations involved in executing machine learning algorithms. For example, the NSP 124 may improve performance when executing predictive models such as artificial neural networks (ANNs) (including multilayer feedforward neural networks (MLFFNN), the recurrent neural networks (RNN), and/or the radial basis functions (RBF)). The ANN executed by the NSP 124 may access predefined training weights stored in the memory 106 for performing operations on user data.

The SoC 100 may be coupled to a display 114 for interacting with a user. The display 114 may be controlled by a driver 114A, such as shown in and described with reference to FIG. 2, which is another example of a processor. The driver 114A may include an overdrive circuit 114B configured for improving operation of the display 114 by the driver 114A, such as by reducing color leakage. The driver 114A may be an application specific integrated circuit (ASIC) configured to perform methods described according to aspects of this disclosure. In some implementations, the display 114 may be a field sequential display and the driver 114A is configured to apply control signals to the field sequential display to generate the display of individual colors in a sequential manner according to image frames output from the SoC 100 to the display 114. The SoC 100 also may include a graphics processing unit (GPU) 126 for rendering images on the display 114. In some implementations, the CPU 104 may perform rendering to the display 114 without a GPU 126. In some implementations, the GPU 126 may be configured to execute instructions for performing operations unrelated to rendering images, such as for processing large volumes of datasets in parallel.

Processing algorithms, techniques, and methods that are described herein may be executed by at least one processor of the SoC 100, which may include execution by all steps on one of the processors (such as DSP 112, CPU 104, NSP 124, GPU 126) or may include execution of steps across a combination of one or more of the processors (such as DSP 112, CPU 104, NSP 124, GPU 126, driver 114A). In some implementations, at least one of the driver 114A, the GPU 126, or the CPU 104 executes instructions to perform various operations described herein, including determining signals with overdrive to accelerate the switching of transistors in the display 114.

Input/output components may be coupled to the SoC 100 through an input/output (I/O) hub 116. An example of a hub 116 is an interconnect to a peripheral component interconnect express (PCIe) bus. Example components coupled to hub 116 may be components used for interacting with a user, such as a touch screen interface and/or physical buttons. Some components coupled to hub 116 also may include network interfaces for communicating with other devices, including a wide area network (WAN) adaptor (such as WAN adaptor 152), a local area network (LAN) adaptor (such as LAN adaptor 153), and/or a personal area network (PAN) adaptor (such as PAN adaptor 154). A WAN adaptor 152 may be a 4G LTE or a 5G NR wireless network adaptor. A LAN adaptor 153 may be an IEEE 802.11 WiFi wireless network adapter. A PAN adaptor 154 may be a Bluetooth wireless network adaptor. Each of the WAN adaptor 152, LAN adaptor 153, and/or PAN adaptor 154 may be coupled to an antenna that may be shared by each of the adaptors 152, 153, and 154, or coupled to multiple antennas configured for primary and diversity reception and/or configured for receiving specific frequency bands. In some implementations, the WAN adaptor 152, LAN adaptor 153, and/or PAN adaptor 154 may share circuitry, such as portions of a radio frequency front end (RFFE).

Audio circuitry 156 may be integrated in SoC 100 as dedicated circuitry for coupling the SoC 100 to a speaker 120 external to the SoC 100, which may be a transducer such as a speaker (either internal to or external to a device incorporating the SoC 100) or headphones. The audio circuitry 156 may include coder/decoder (CODEC) functionality for processing digital audio signals. The audio circuitry 156 may further include one or more amplifiers (such as a class-D amplifier) for driving a transducer coupled to the SoC 100 for outputting sounds generated during execution of applications by the SoC 100.

The SoC 100 may couple to external devices outside the package of the SoC 100. For example, the SoC 100 may be coupled to a power supply 118, such as a battery or an adaptor to couple the SoC 100 to an energy source. The signal processing described herein may be adapted to and achieve power efficiency to support operation of the SoC 100 from a limited-capacity power supply 118 such as a battery. For example, operations may be performed on a portion of the SoC 100 configured for performing the operation at a lowest power consumption. As another example, operations themselves are performed in a manner that reduces an amount of computations to perform the operation, such that the algorithm is optimized for extending the operational time of a device while powered by a limited-capacity power supply 118. In some implementations, the operations described herein may be configured based on a type of power supply 118 providing energy to the SoC 100. For example, a first set of operations may be executed to perform a function when the power supply 118 is a wall adaptor. As another example, a second set of operations may be executed to perform a function when the power supply 118 is a battery.

The SoC 100 also may include or be coupled to additional features or components that are not shown in FIG. 1. Although components are shown integrated as a single SoC 100, which may include all components built on a single semiconductor die with a common semiconductor substrate, other arrangements of the illustrated blocks different number of dies, substrates, and/or packages may be arranged to accomplish the same functionality described in this disclosure.

The memory 106 may include a non-transient or non-transitory computer readable medium storing computer-executable instructions as instructions 108 to perform all or a portion of one or more operations described in this disclosure. The instructions 108 may include a multimedia application (or other suitable application such as a messaging application that may display multimedia content or otherwise influence the output of the display 114) to be executed by the SoC 100 that records, processes, or outputs video signals. The instructions 108 also may include other applications or programs executed by the SoC 100, such as an operating system and applications other than for multimedia processing.

While the SoC 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the SoC 100.

Figure 2:
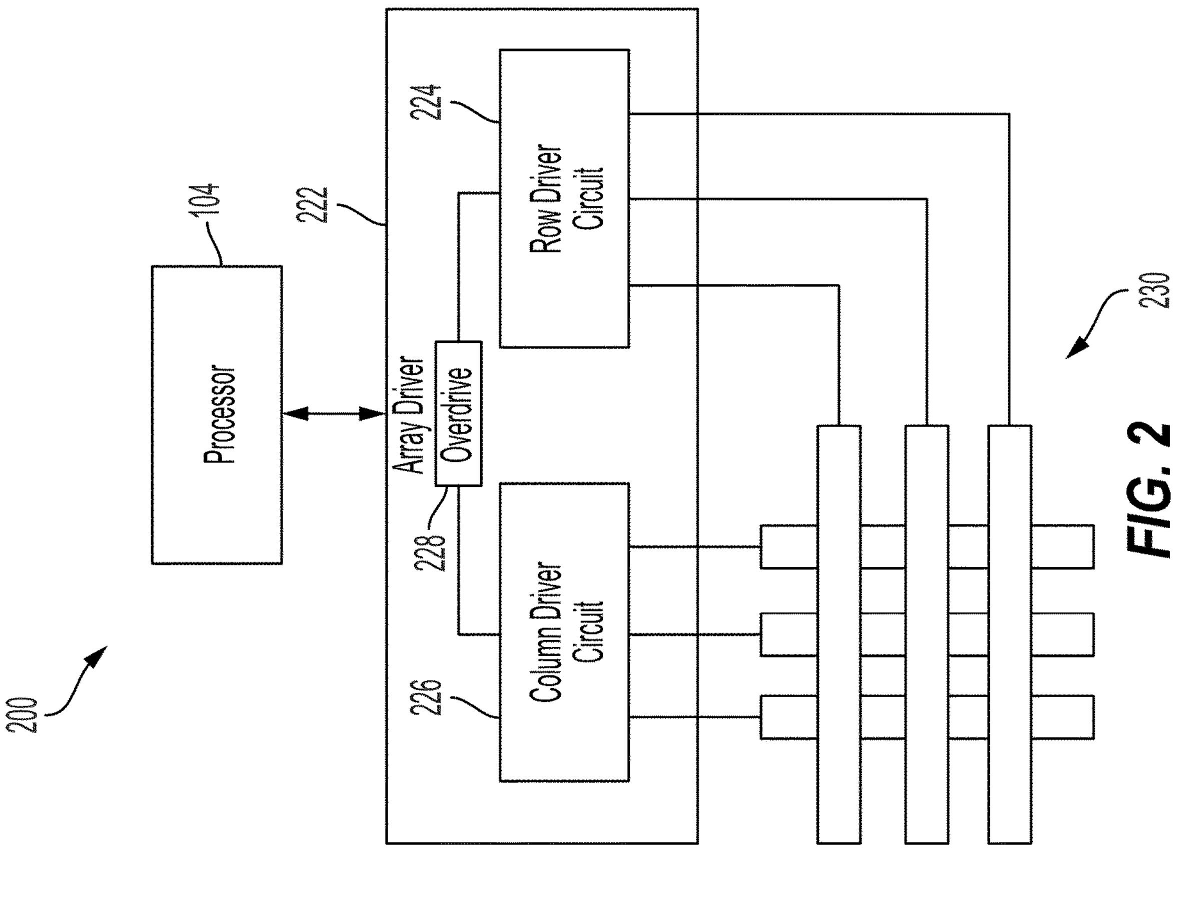
FIG. 2 shows a system block diagram illustrating an example electronic device incorporating a pixel array display.

One example driver circuit is shown in FIG. 2 and described below. FIG. 2 shows a system block diagram 200 illustrating an example electronic device incorporating a pixel array display. The electronic device includes a SoC 100 with CPU 104 that may be configured to execute one or more software modules. In addition to executing an operating system, the CPU 104 may be configured to execute one or more software applications, including a web browser, a telephone application, an email program, or any other software application. The CPU 104 can be configured to communicate, such as through a hardware driver, with an array driver 222, which is one nonlimiting example of driver 114A from FIG. 1. The array driver 222 can include a row driver circuit 224 and a column driver circuit 226 that provide signals to, such as a display array. Although FIG. 2 illustrates a 3×3 pixel array for the sake of clarity, the display array 230 may contain a very large number of pixels, and may have a different number of pixels in rows than in columns, and vice versa. An overdrive block 228 may be one nonlimiting example of overdrive 114B from FIG. 1. The overdrive block 228 may modify a magnitude of change of driver signals sent to the display array 230 by the driver circuits 224 and 226 to increase a transition speed of the pixels in the display array 230.

Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 3:
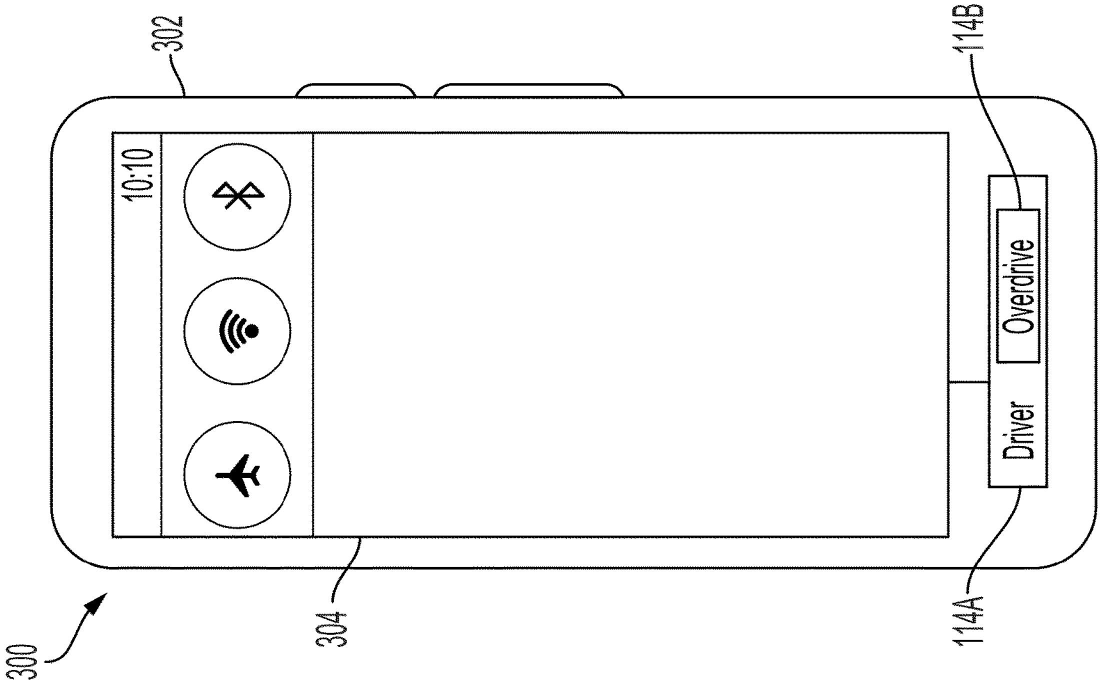
FIG. 3 shows a diagram of an example mobile device, such as a mobile phone, including a display with overdrive.
Figure 4:
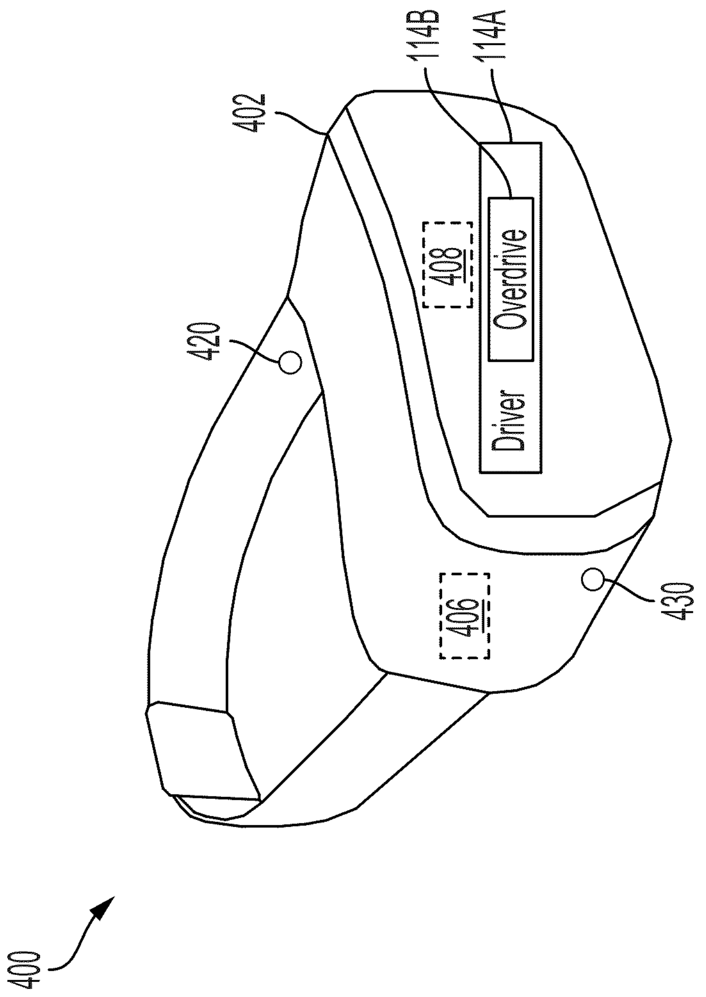
FIG. 4 shows a diagram of an example headset, such as a virtual reality, mixed reality, or augmented reality headset, operable to drive a display.

Aspects of the signal processing described in FIG. 1 or FIG. 2 are applied in example devices, such as the example devices of FIG. 3 or FIG. 4. FIG. 3 shows a diagram of an example mobile device, such as a mobile phone, including a display with overdrive. The mobile device 302 includes display 304. Additionally, components of the SoC 100 and/or driver 114A are integrated in the mobile device 302. For example, driver 114A with overdrive block 114B may be included to control the output of images on the display 304. The overdrive block 114B may be configured to implement one or more of the techniques described herein, such as with reference to FIG. 5. FIG. 4 shows a diagram of an example headset, such as a virtual reality, mixed reality, or augmented reality headset, operable to drive a display. The headset device 402 includes display 408, microphone(s) 430 and speaker(s) 420. Additionally, components of the SoC 100 and/or driver 114A are integrated in the headset device 402. For example, driver 114A with overdrive block 114B may be included to control the output of images in the display inside the headset device 402. The overdrive block 114B may be configured to implement one or more of the techniques described herein, such as with reference to FIG. 5.

Aspects of this disclosure are directed to certain implementations; however, the teachings herein can be applied in a multitude of different ways to different devices. The described implementations may be implemented in any device that is configured to display an image, whether in motion (such as video) or stationary (such as still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, Bluetooth devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (such as e-readers), computer monitors, auto displays (such as odometer display, etc.), cockpit controls and/or displays, camera view displays (such as display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as MEMS and non-MEMS), aesthetic structures (such as display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, and electronic test equipment. Thus, the teachings are not intended to be limited to the implementations depicted solely in the Figures, but instead have wide applicability as will be readily apparent to a person having ordinary skill in the art.

Figure 5A:
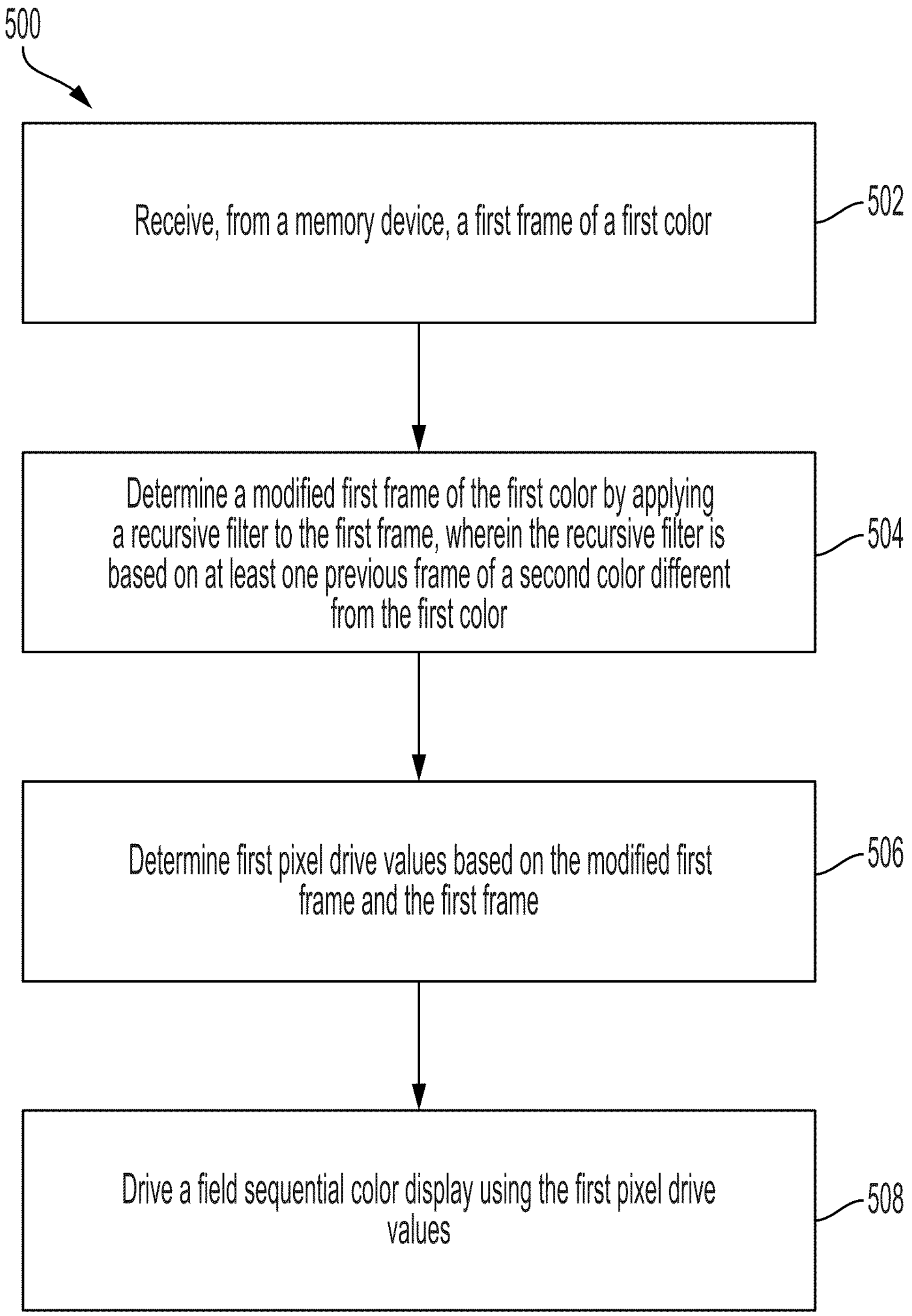
FIG. 5A shows a flow chart of an example method for processing image data to select drive values for a display using a recursive filter.

The system 100 of FIG. 1 may be configured to perform the operations described with reference to FIG. 5A to determine a drive signal for the display. FIG. 5A shows a flow chart of an example method for processing image data to determine drive values for a display using a recursive filter. The operations of FIG. 5A may result in an improved output display signal, which results in an improved user experience. Each of the operations described with reference to FIG. 5A may be performed by one or a combination of the processors of the SoC 100.

At block 502, image data is received, in which the image data may include a first image frame corresponding to a representation of a scene at a first time in a first color and a second image frame corresponding to a representation of the same scene at the same first time in a second color. That is, the different colors of a single scene may be represented in different image frames, in which each image frame contains pixel values for a single color. A sequence of image frames displayed in rapid succession blur in a user's visual interpretation of the output image frames of different color to produce a multi-color representation of the scene. The image data may be formatted in one of many combinations of different color image frames to represent the scene. For example, in a red-green-blue (RGB) representation the image data may include a first image frame corresponding to red pixel values, a second image frame corresponding to green pixel values, and a third image frame corresponding to blue pixel values, each of the first, second, and third image frames corresponding to a same time of the same scene. In another example, in a red-green-blue-green (RGBG) representation the image data may include four image frames corresponding to red, green, blue, and green representations.

The image data may be received, for example, from the SoC 100. For example, a frame buffer stored in memory 106 may be output to the display driver 114A to cause the display to output a representation of the scene represented by the image data. The image data in the frame buffer may be generated by the GPU 126 or the CPU 104 under control of an application executing on the device containing the SoC 100. In some examples, the frame buffer may include image data captured from one or more cameras coupled to the SoC 100.

The image data may alternatively be received from a wireless camera, wireless graphics processing system, or other wireless device, in which the image data is received through one or more of the WAN adaptor 152, the LAN adaptor 153, and/or the PAN adaptor 154. The image data may alternatively be received from a memory location or a network storage location, such as when the image data was previously captured and is now retrieved from memory 106 and/or from a remote location through one or more of the WAN adaptor 152, the LAN adaptor 153, and/or the PAN adaptor 154. In some implementations, the capture or retrieval of image data may be initiated by a multimedia application executing on the SoC 100. Image data, comprising the image frames, may be retrieved at block 502 and further processed by the driver 114A according to the operations described in one or more of the following blocks.

At block 504, the modified first frame may be determined, obtained, ascertained, calculated, or selected by applying a recursive filter to the first frame, where the recursive filter may be based on at least one previous frame of a second color different from a first color. That is, the modification of a single color in a single image frame may be selected using the recursive filter. That recursive filter may be based on at least the last different prior color, but some implementations may apply additional prior colors. Again, in a red-green-blue (RGB) representation, a single pixel, for a singular data image, may correspond to three different image frames with three different corresponding color values. The three image frames are integrated by the user's eye to perceive the singular pixel color of the singular data image. To enable fast switching from one image frame with a corresponding color value with the minimal color leakage, the processor selects a modified frame color value. For example, if the first frame with the corresponding red color value is 100 on scale between 0 and 255 and the pervious frame with the corresponding red color value is 255, then the recursive filter may select that the first frame with the corresponding color value should be modified from 100 to 75 to overdrive the display and increase the transition speed of the display. This may enable brighter and more accurate color displays perceived by the display viewer. An example operation of modifying the first image frame is shown in FIG. 5B.

Figure 5B:
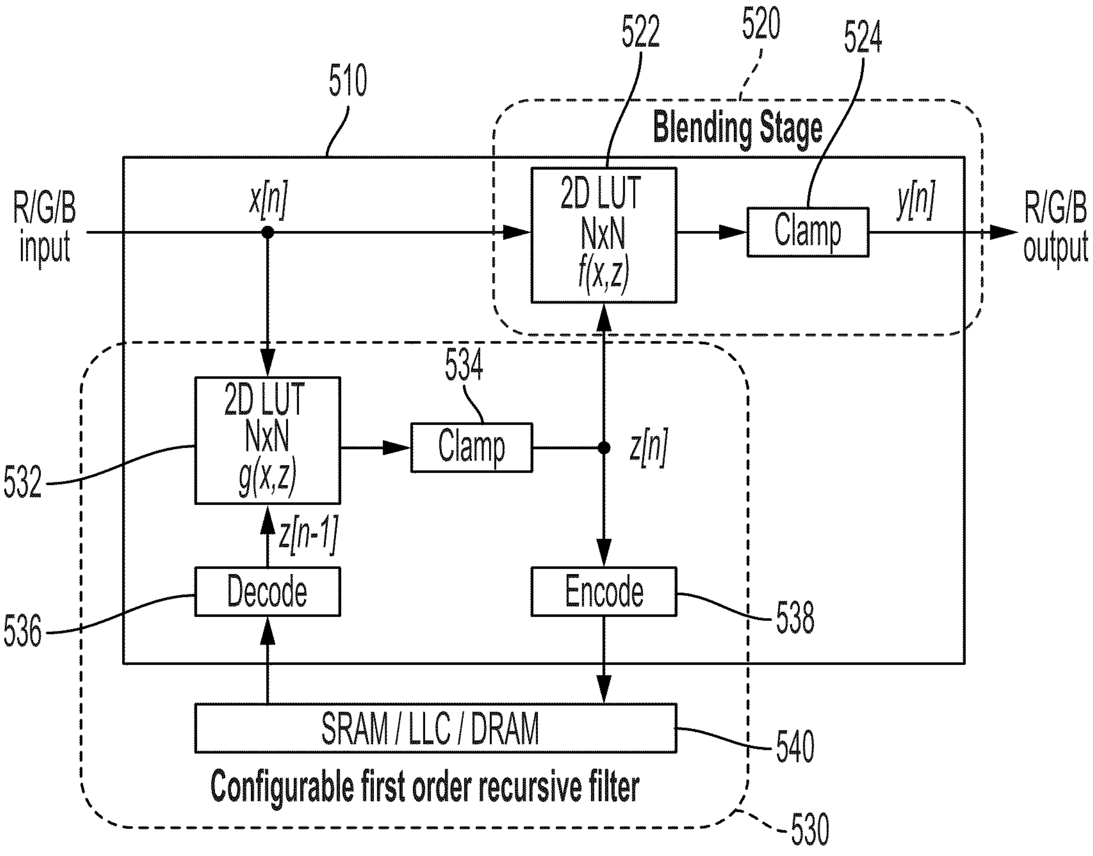
FIG. 5B shows a block diagram illustrating an example circuit for modifying pixels values for an image frame to apply overdrive based on a recursive filter.

FIG. 5B shows a block diagram illustrating an example circuit for modifying pixels values for an image frame to apply overdrive based on a recursive filter. An overdrive circuit 510 may be an example of the overdrive circuit 114B of FIG. 1, FIG. 2, FIG. 3, or FIG. 4. The overdrive circuit receives individual pixel values of an image frame, the input pixel values labeled x[n]. Input image frames may be received from a coupled processor or memory, such as CPU 104 or memory 106 of FIG. 1.

The input pixel x[n] is input to a recursive filter 530 applied as input to a look-up table (LUT) 532 that selects an output based on function g(x,z). Although a LUT is described for block 532, the block 532 may implement any manner of selecting values of function g(x,z). The other input to the block 532 is value z[n−1], which is a previous value of the pixel corresponding to x[n]. The LUT 532 defines an overdrive for modifying the input pixel x[n] as a function of the previous corresponding pixel value z[n−1]. The corresponding pixel value z[n−1] may be a pixel value from a previous image frame that represented a different color than the color corresponding to input value x[n]. The output of the LUT 532 may be limited at clamp block 534 to select a modified output value z[n]. The modified output values may be stored in memory 540 by encoding the data in encoder 538 to reduce storage size in the memory 540. The memory 540 may be a local memory (such as SRAM, DRAM, or cache) within the driver circuit 510. The previous pixel values z[n−1] may be retrieved from that memory 540 through decoder 536 that is configured to reverse the encoding performed by encoder 538.

A blending stage 520 may include a lookup table (LUT) 522 that blends the modified value z[n] with the original value x[n] through implementing a function f(x,z). Although the blending is illustrated as performed with a LUT 522, other techniques for implementing the function f(x,z) may be implemented. The output of the LUT 522 is clamped to produce the output value y[n], which is the modified image frame selected by applying overdrive in the recursive filter 530 and the blending stage 520.

The recursive filter 530 may be reconfigurable to allow user or system adjustments to the response of the electronic display driven based on the overdrive circuit 510. For example, different LUTs or functions may be configured for LUTs 532 and 522 to adjust the response of the electronic display. In some implementations, the LUTs 532 and 522 may be adjusted based on a temperature of the electronic display. The temperature-compensation may allow the response of the electronic display to be maintained across different operating conditions. As another example, the recursive filter may be reconfigured based on content in the image frame or a series of images frames in a video sequence. In some implementations, the reconfiguring may include selecting an amount of motion in the first frame meeting at least one criteria (such as an average motion vector of a threshold magnitude) and, in response to the amount of motion meeting the at least one criteria, disabling the recursive filter and selecting second pixel drive values based on the first frame.

Although the recursive filter 530 is shown as a single-order recursive filter, in other implementations the recursive filter 530 may implement a higher-order recursive filter, such as a second-order, third-order, fourth-order or higher-order recursive filter by increasing the dimensionality of the LUT 532 to receive additional previous pixel values such as z[n−2], z[n−3], and/or z[n−4]. In some implementations, the order level of the recursive filter may be reconfigured during operation of the electronic device.

In some implementations, the size of the LUTs 532 and/or 522 may be different. For example, the LUT 532 may be a smaller table to reduce memory requirements and interpolation used to select values in-between values stored in the LUT 532. For example, the LUT 532 may performs 2D LUT interpolation based on bilinear interpolation or interpolation of a Delaunay triangulation.

Figure 5C:
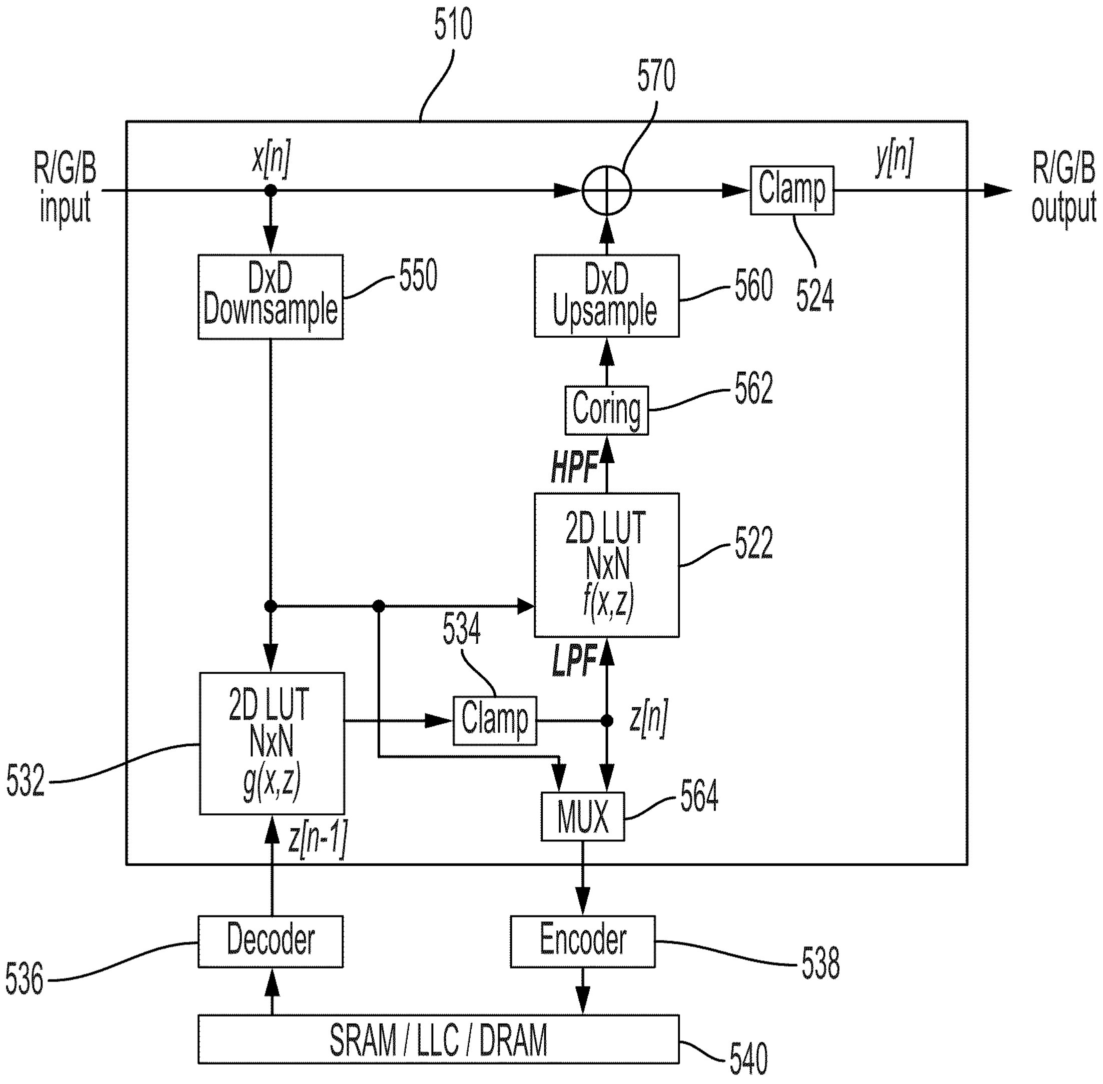
FIG. 5C shows a block diagram illustrating an example circuit for modifying pixels values for an image frame to apply overdrive based on a recursive filter.

Another technique for modifying pixel values for an image frame to apply overdrive based on a recursive filter is shown in FIG. 5C. FIG. 5C shows a block diagram illustrating an example circuit for modifying pixels values for an image frame to apply overdrive based on a recursive filter. Aspects of FIG. 5C are similar to similarly-numbered items in FIG. 5B. The implementation of FIG. 5C includes a downsampler 550 and upsampler 560 that may reduce a size of the input image frame for processing and return to the original image frame size for output, which reduces memory bandwidth, memory footprint, and power consumption. The output of upsampler 560 is combined at block 570 for output to clamp 524. Multiplexer 564 allows x[n] to go to memory after downsampling. If a first input to multiplexer 564 is selected then the output to encoder 538 is the modification based only on the current and previous frame. If a second input to the multiplexer 564 is selected then the output to encoder 538 is influenced by the current frame and one or more frames from the past. Additionally, coring function 562 provides a programmable coring function that applies small corrections towards zero. The coring block 562 may correct for numerical errors caused by quantization that may get amplified by the cyclic nature of recursion. When the content stops changing, the overdrive corrections should go to zero. The coring function 562 improves the rate that overdrive corrections go to zero despite the use of limited precision fixed-point arithmetic that may otherwise produce small residuals.

Referring back to FIG. 5A, at block 506, the first pixel drive values may be determined, obtained, ascertained, calculated, or selected at least by the modified first frame and the first frame. That is, once the modified first frame with the corresponding color value has been selected, the drive pixel value that may change the previous frame with the corresponding color value to the modified first frame with the corresponding color value is selected. For example, the output of the overdrive circuit 510 of FIG. 5B may be converted to a row and column drive voltage value for controlling the pixel array of the electronic display.

At block 508, the first pixel drive values are applied to the field sequential color display to switch the prior color value corresponding to the prior frame to the modified color value corresponding to the modified first frame in a shorter time. The driving of block 508 may involve applying the pixel drive value of block 506 to control an amplifier in the row and column drive circuits to cause the application of the voltage to individual transistors in the electronic display.

The operations described with reference to blocks 502, 504, 506 and 508 of FIG. 5A may be performed by the driver 114A illustrated in FIG. 1. However, the operations may alternatively be performed by one or more of the processors of FIG. 1, including one or more of the CPU 104, the DSP 112, the GPU 126, or the NSP 124.

Figure 6A:
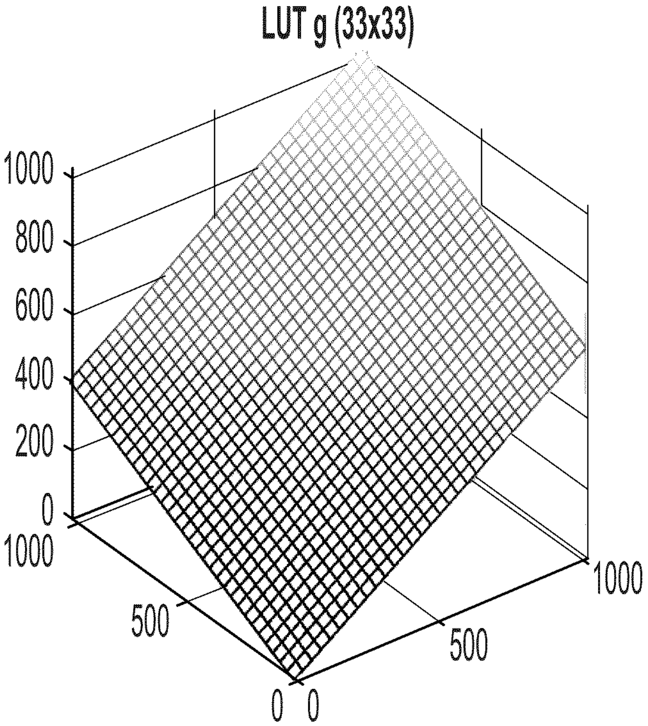
FIGS. 6A and 6B show graphs illustrating examples of look up tables in accordance with some examples of the present disclosure.
Figure 6B:
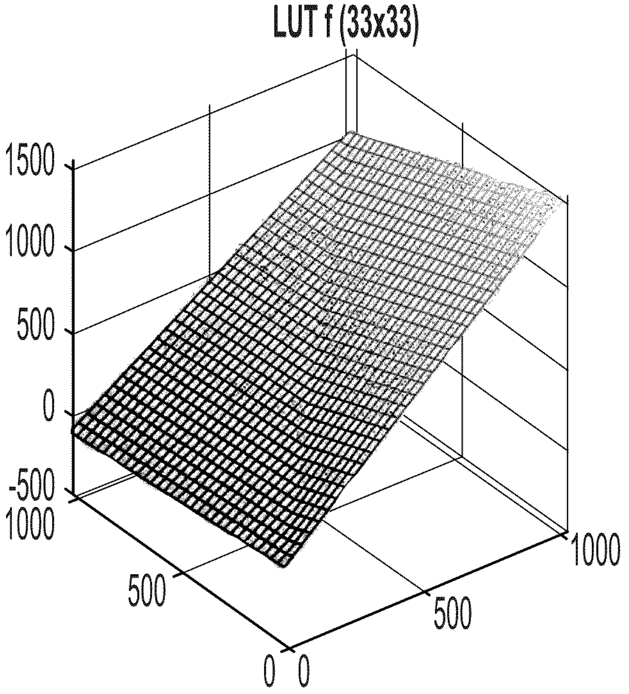

FIGS. 6A and 6B show graphs illustrating examples of look up tables in accordance with some examples of the present disclosure. FIG. 6A shows a planar look up table. FIG. 6B shows a biplanar look up table. These lookup tables may be stored as LUT 532 in the recursive filter 530 of FIG. 5B. The look up tables may select the modified first frame with the corresponding color value in a quicker way. The recursive filter may input the prior frame with the corresponding color value and the first frame with the corresponding color value and look up, instead of calculating, the modified frame color value thereby possibly saving computational time and processing power.

Figure 7:
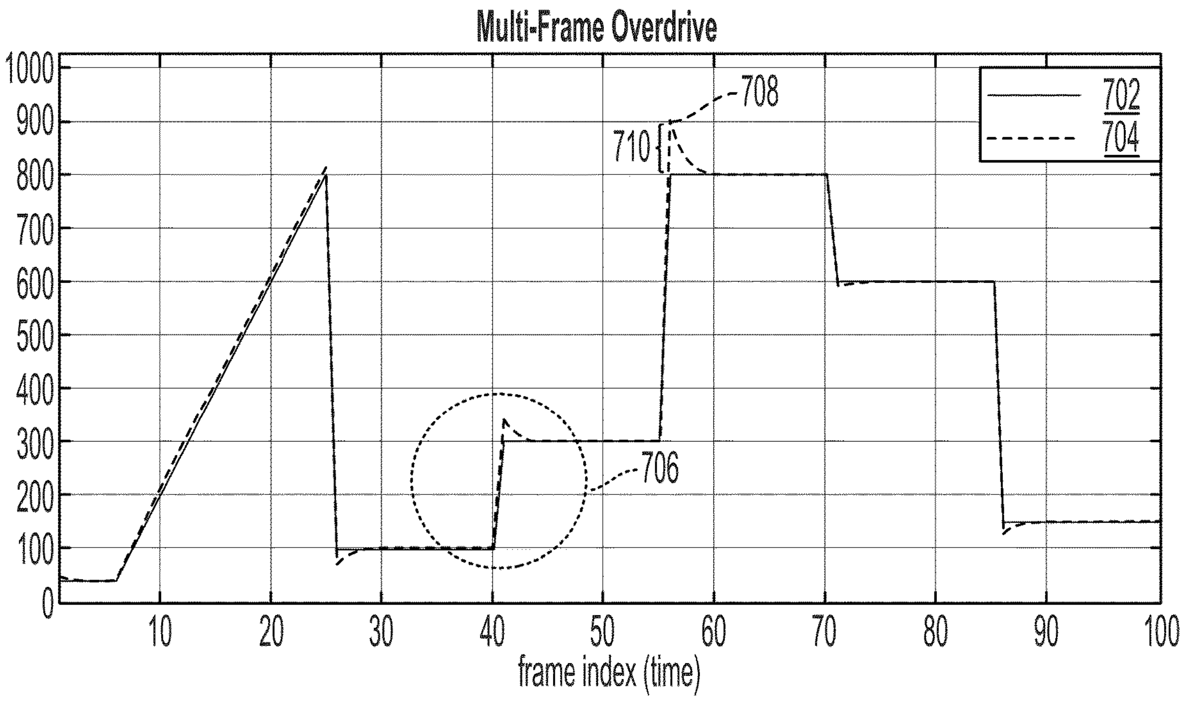
FIG. 7 shows a graph illustrating an example multi-frame overdrive in accordance with some examples of the present disclosure.

FIG. 7 shows a graph illustrating an example multi-frame overdrive in accordance with some examples of the present disclosure. FIG. 7 depicts the changes in the drive values as a result of the overdrive applied according to aspects of this disclosure. The solid line 702 depicts a drive signal based on an unmodified image frame while the dashed line 704 depicts a drive signal based on the modified image frame. At locations where there is a major transition from one value to another, such as transition 706, the overdrive circuit may modify the drive signal to a more extreme value 708 accepting some level of overshoot 710 to accelerate the response of the display and reduce the transition time from one color to another color.

In one or more aspects, techniques for supporting signal processing may include additional aspects, such as any single aspect or any combination of aspects described below or in connection with one or more other processes or devices described elsewhere herein. In a first aspect, supporting multimedia operations may include an apparatus configured to drive an electronic display, such as a sequential field display, by performing operations including receiving, by at least one processor from a memory, a first frame of a first color of image data; selecting, by the at least one processor, a modified first frame of the first color by applying a recursive filter to the first frame, wherein the recursive filter is based on at least one previous frame of a second color different from the first color; and selecting, by the at least one processor, first pixel drive values based on the modified first frame.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to select output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, applying the recursive filter comprises retrieving a value associated with a first pixel value of the first frame and a second pixel value of the at least one previous frame.

In a third aspect, in combination with one or more of the first aspect or the second aspect, the value reflects a plane function using the first pixel value and the second pixel value.

In a fourth aspect, in combination with one or more of the first aspect through the third aspect, the value reflects a bi-linear function using the first pixel value and the second pixel value.

In a fifth aspect, in combination with one or more of the first aspect through the fourth aspect, the value reflects an interpolated Delaunay triangulation using the first pixel value and the second pixel value.

In a sixth aspect, in combination with one or more of the first aspect through the fifth aspect, the method also includes reconfiguring the recursive filter based on operating conditions of a display.

In a seventh aspect, in combination with one or more of the first aspect through the sixth aspect, reconfiguring the recursive filter comprises reconfiguring the recursive filter based on a temperature of the display.

In an eighth aspect, in combination with one or more of the first aspect through the seventh aspect, the method also includes selecting an amount of motion in the first frame meeting at least one criteria; and in response to the amount of motion meeting the at least one criteria: disabling the recursive filter; and selecting second pixel drive values based on the first frame.

In a ninth aspect, in combination with one or more of the first aspect through the eighth aspect, the method further includes driving a display using the first pixel drive values, wherein the display comprises a field sequential color display.

In a tenth aspect, in combination with one or more of the first aspect through the ninth aspect, selecting the first pixel drive values comprises increasing a rate of change of the first pixel drive values based on the modified first frame above a rate of change of the first pixel drive values based on the first frame.

In an eleventh aspect, in combination with one or more of the first aspect through the tenth aspect, the operations in the described method are executed by a multimedia device.

In a twelfth aspect, in combination with one or more of the first aspect through the eleventh aspect, the multimedia device includes a sequential field display; a memory configured to store image data; and at least one display driver coupled to the memory and to the sequential field display, the at least one display driver configured to perform the operations describe with respect to one or more of the first aspect through the eleventh aspect.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

As used herein, the term “determine” or “determining” encompasses a wide variety of actions and, therefore, “determining” can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (such as application specific integrated circuits (ASICs), digital signal processors (DSP), graphics processing unit (GPU), central processing unit (CPU), computer vision processor (CVP), or neural signal processor (NSP)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to the Figures referenced above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art understand that one or more blocks (or operations) described with reference to FIG. 5 may be combined with one or more blocks (or operations) described with reference to another of the figures. For example, one or more blocks (or operations) of FIG. 5A may be combined with one or more blocks (or operations) of FIG. 1 or FIG. 2. As another example, one or more blocks associated with FIG. 5A, FIG. 5B, and/or FIG. 5C may be combined with one or more blocks (or operations) associated with FIG. 3 or FIG. 4.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

In one or more aspects, the operations described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

The operations of a method or algorithm disclosed herein may be implemented in a processor-executable software module which may reside on a computer-readable medium and commercially made available as a computer program product as software. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc wherein disks usually reproduce data magnetically and discs reproduce data optically with lasers. Combinations of the above should also be included within the scope of computer-readable media.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward," or "left" and "right" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:

receiving, by at least one processor from a memory, a first frame of a first color of image data;

selecting, by the at least one processor, a modified first frame of the first color by applying a recursive filter to the first frame, wherein the recursive filter is associated with at least one previous frame of a second color different from the first color;

selecting, by the at least one processor, first pixel drive values associated with the modified first frame; and selecting, by the at least one processor, to disable the recursive filter when an amount of motion in the first frame meets at least one criteria, wherein applying the recursive filter to the first frame includes: downsampling the first frame to produce a downsampled first frame, retrieving downsampled data relating to the at least one previous frame that is at a resolution of the downsampled first frame, and determining the modified first frame based on the downsampled first frame and the downsampled data.

2. The method of claim 1, wherein applying the recursive filter comprises retrieving a value associated with a first pixel value of the first frame and a second pixel value of the at least one previous frame.

3. The method of claim 2, wherein the value reflects a plane function using the first pixel value and the second pixel value.

4. The method of claim 2, wherein the value reflects a bi-linear function using the first pixel value and the second pixel value.

5. The method of claim 2, wherein the value reflects an interpolated Delaunay triangulation using the first pixel value and the second pixel value.

6. The method of claim 1, further comprising reconfiguring the recursive filter associated with operating conditions of a display.

7. The method of claim 6, wherein reconfiguring the recursive filter comprises reconfiguring the recursive filter associated with a temperature of the display.

8. The method of claim 1, further comprising driving a display using the first pixel drive values, wherein the display comprises a field sequential color display.

9. The method of claim 8, wherein the first pixel drive values applied to the display increase a rate of change of the first pixel drive values associated with the modified first frame above a rate of change of the first pixel drive values associated with the first frame.

10. An apparatus, comprising:
a memory storing processor-readable code; and
one or more processors coupled to the memory, the one or more processors configured to execute the processor-readable code to cause the one or more processors to:
receive a first frame of a first color of image data;
select a modified first frame of the first color by applying a recursive filter to the first frame, wherein the recursive filter is associated with at least one previous frame of a second color different from the first color;
apply first pixel drive values associated with the modified first frame; and
select to disable the recursive filter when an amount of motion in the first frame meets at least one criteria,
wherein applying the recursive filter to the first frame includes: downsampling the first frame to produce a downsampled first frame, retrieving downsampled data relating to the at least one previous frame that is at a resolution of the downsampled first frame, and determining the modified first frame based on the downsampled first frame and the downsampled data.

11. The apparatus of claim 10, wherein applying the recursive filter comprises retrieving a value from a memory for the modified first frame associated with a first pixel value of the first frame and a second pixel value of the at least one previous frame.

12. The apparatus of claim 10, wherein the one or more processors is configured to perform further operations comprising reconfiguring the recursive filter associated with operating conditions of a display.

13. The apparatus of claim 12, wherein reconfiguring the recursive filter comprises reconfiguring the recursive filter associated with a temperature of the display.

14. The apparatus of claim 10, wherein the one or more processors is further configured to drive a display using the first pixel drive values, wherein the display comprises a field sequential color display.

15. A multimedia device, comprising:
a sequential field display;
a memory configured to store image data;
at least one display driver coupled to the memory and to the sequential field display, the at least one display driver configured to perform operations comprising:
receive a first frame of a first color of the image data;
select a modified first frame of the first color by applying a recursive filter to the first frame, wherein the recursive filter is associated with at least one previous frame of a second color different from the first color;
select first pixel drive values associated with the modified first frame;
drive the sequential field display using the first pixel drive values; and
select to disable the recursive filter when an amount of motion in the first frame meets at least one criteria,
wherein applying the recursive filter to the first frame includes: downsampling the first frame to produce a downsampled first frame, retrieving downsampled data relating to the at least one previous frame that is at a resolution of the downsampled first frame, and determining the modified first frame based on the downsampled first frame and the downsampled data.

16. The multimedia device of claim 15, wherein applying the recursive filter comprises retrieving a value from the memory for the modified first frame associated with a first pixel value of the first frame and a second pixel value of the at least one previous frame.

17. The multimedia device of claim 15, wherein the at least one display driver is configured to reconfigure the recursive filter associated with operating conditions of the sequential field display.

18. The multimedia device of claim 17, wherein the at least one display driver is configured to reconfigure the recursive filter associated with a temperature of the sequential field display.

* * * * *